No. 841,723. PATENTED JAN. 22, 1907.
W. T. SEARS.
POWER TRANSMISSION DEVICE.
APPLICATION FILED SEPT. 28, 1906.

Witnesses:
Elmer R. Shipley.
M. S. Belden.

Willard Thomas Sears
Inventor
by James W. See
Attorney

UNITED STATES PATENT OFFICE.

WILLARD THOMAS SEARS, OF PHILADELPHIA, PENNSYLVANIA, ASSIGNOR TO NILES-BEMENT-POND COMPANY, OF JERSEY CITY, NEW JERSEY.

POWER-TRANSMISSION DEVICE.

No. 841,723.     Specification of Letters Patent.     Patented Jan. 22, 1907.

Application filed September 28, 1906. Serial No. 336,584.

*To all whom it may concern:*

Be it known that I, WILLARD THOMAS SEARS, a citizen of the United States, residing at Philadelphia, Philadelphia county, Pennsylvania, have invented certain new and useful Improvements in Power-Transmission Devices, of which the following is a specification.

This invention pertains to apparatus for the transmission of power in which are involved relatively shifting toothed members for changing the rate of motion or the direction of motion or the condition from rest to motion, and vice versa, and relates to improved means for guarding against, first, the difficulties of intermembering the teeth when teeth do not happen to match tooth-spaces; second, the liability of the transmission of heavy work through teeth but partially engaged, and, third, the labor of shifting teeth into engagement while they are under the strain of heavy duty.

The invention will be readily understood from the following description, taken in connection with the accompanying drawings, in which—

Figure 1:
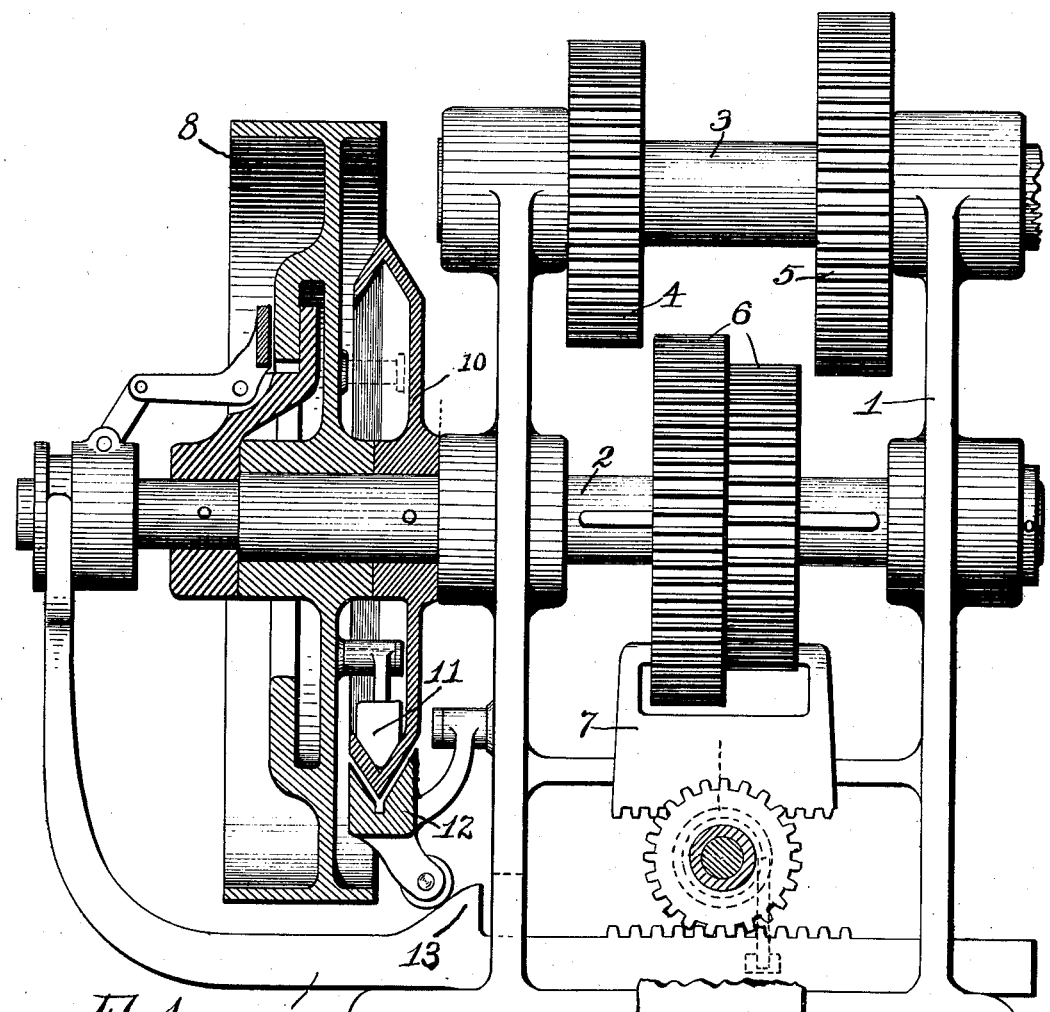
Figure 3:
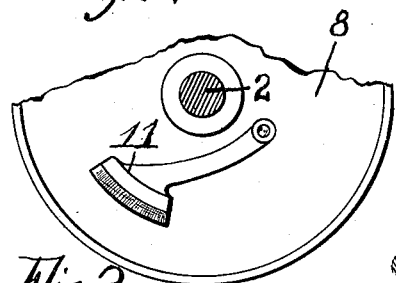
Figures 2, 4:
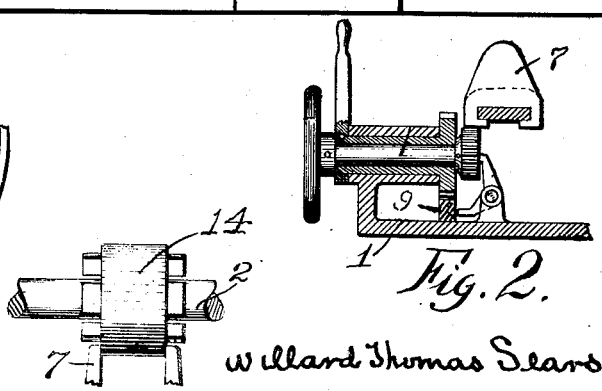

Figure 1 is a front elevation of an apparatus embodying my invention; Fig. 2, a vertical transverse section of a portion of the same, illustrating shifting mechanism which may be employed; Fig. 3, a side elevation of the driving-pulley and one of the centrifugal weights, and Fig. 4 a front elevation of the shifting toothed member in modified form.

In the drawings, 1 indicates housing parts; 2, the driving-shaft; 3, the driven shaft; 4, a gear fast on the driven shaft; 5, a second but larger gear fast on the driven shaft; 6, a pair of gears fast with each other and splined on the driving-shaft; 7, a shifter engaging the pair of splined gears and adapted to slide them so that its component gears may mesh with either of the mating gears, respectively, on the driven shaft; 8, a friction-clutch, which may be of any desired or suitable ordinary construction; 9, an endwise-movable bar to serve in engaging and disengaging the clutch; 10, a friction-disk fast on the driving-shaft contiguous to the clutch, the rim of this disk being illustrated as V-shaped in cross-section; 11, centrifugal weights pivoted to the loose or pulley member of the friction-clutch, their free portions engaging within the rim of the friction-disk; 12, a brake-shoe pivoted to the housing and adapted to coöperate with the friction-disk; 13, a cam-lug carried by clutch-shifting bar 9 and coöperating with the brake-shoe in such manner as to apply the latter when the bar is moved somewhat beyond the clutch-releasing position, and 14 the sliding member of an ordinary jawed clutch serving to illustrate another form of shifting toothed member.

The shifting of the sliding toothed member and also the operation of the friction-clutch may be accomplished in any desired or usual manner, the illustration showing, in Fig. 2, a simple rack-and-pinion arrangement, permitting the two shifting devices to be adjusted independently, the shifter 7 having a rack operated by a pinion having a hand-wheel on its shaft, while the clutch-operating bar 9 has a rack operated by a pinion having a handle on its shaft, which latter shaft is tubular and surrounds the other shaft, all as clearly understandable from Fig. 2. These details are, however, not herein claimed. In Fig. 4 the part 14 will be recognized as the jawed sliding member of an ordinary jawed clutch commonly employed in engaging loose gears or pulleys to or disengaging them from a shaft.

Under ordinary conditions, if the parts were stationary, the friction-clutch being released, for instance, an attempt to slide gear 6 into active position might be defeated by the failure of tooth ends to register with tooth-spaces. Something might require to be angularly adjusted before the engagement of the teeth could be effected. Again, if gears 6 were in rotation, opportunity would present itself for starting the teeth into the tooth-spaces, but the result would be that the full working strain would come on the gear-teeth as soon as they were engaged, even to the most trifling extent. This may result in the breaking of teeth, and always results in mutilating the ends of the teeth, and considerable force might be required to complete the sliding engagement of the teeth after they had gotten under the strain of full work. These considerations will apply to most any power-transmission system involving a toothed member to be shifted into and out of engagement with a mating toothed member.

In the present construction assume that the friction-clutch is released, which would mean that under ordinary conditions the driving-shaft would be at rest; but while the pulley of the friction-clutch is thus released from the driving-shaft the centrifugal weights frictionally engage the interior of the friction-disk, which is fast on the driving-shaft, and this friction will turn the driving-shaft and the shifting gears after the main power has been cut off. While the gears 6 are thus in rotation they may be shifted into engagement with one of the mating gears, the turning of the sliding gear insuring an opportunity for the proper entry of teeth. As soon as the teeth shall have started into engagement then the sliding gear ceases its rotation, the grip of the centrifugal weights not being sufficient to turn the driven shaft. The sliding gear may now be shifted to position of complete engagement while under only trifling tangential strain. After the engagement of teeth has been completed then the friction-clutch may be engaged and full power thrown on. Teeth may thus be quickly and easily and safely thrown into and out of engagement regardless of how heavy the power may be which is to be transmitted through them when in full engagement.

In connection with the system described and also regardless of the peculiarities thus far referred to it may become desirable to quickly arrest the motion of all rotating parts beyond the pulley of the friction-clutch. In the present case the clutch-operating bar may be moved to the left to disengage the friction-clutch and then if it be desired to arrest the driving-shaft the bar may be moved a trifle farther, thus applying the brake to the friction-disk, and this brake may also be employed in similar manner for arresting the motion of the driving-shaft when the driven shaft is not in motion.

I claim—

1. Power-transmission apparatus comprising a pair of toothed members, supports for said toothed members, means for shifting one of said toothed members into and out of engagement with its mate, a rotary driving part loose relative to said members, a friction-clutch for causing said rotary driving part to transmit power to the toothed members when engaged, a friction-disk turning positively in unison with one of said toothed members, and a centrifugal weight driven by said rotary driving part and engaging said friction-disk, combined substantially as set forth, whereby one of said toothed members is under the rotative influence of the centrifugal weight after the main power is unclutched from it.

2. Power-transmission apparatus comprising a pair of toothed members, supports for said toothed members, means for shifting one of said toothed members into and out of engagement with its mate, a rotary driving part loose relative to said members, a friction-clutch for causing said rotary driving part to transmit power to the toothed members when engaged, a friction-disk turning positively in unison with one of said toothed members, a centrifugal weight driven by said rotary driving part and engaging said friction-disk, a brake-shoe coöperating with said friction-disk, and a clutch-operating part coöperating with the brake-shoe and adapted to apply it after the friction-clutch is released, combined substantially as set forth.

3. Power-transmission apparatus comprising a member to be rotated by power selectively at full power or minor power, a rotary driving part loose relative to said member, a friction-disk fast with said member, a centrifugal weight carried by the driving part and engaging the disk to transmit minor power, and a friction-clutch connected with said member and driving part for transmitting full power, combined substantially as set forth.

WILLARD THOMAS SEARS.

Witnesses:
WILLIAM B. PAGE,
SAMUEL C. KANE.